July 15, 1969  J. B. FLYNN  3,455,321

ADDITIVE INJECTION SYSTEM

Filed April 8, 1966  3 Sheets-Sheet 1

Inventor
Jac B. Flynn
By: Olson, Trexler, Wolters & Bushnell
attys.

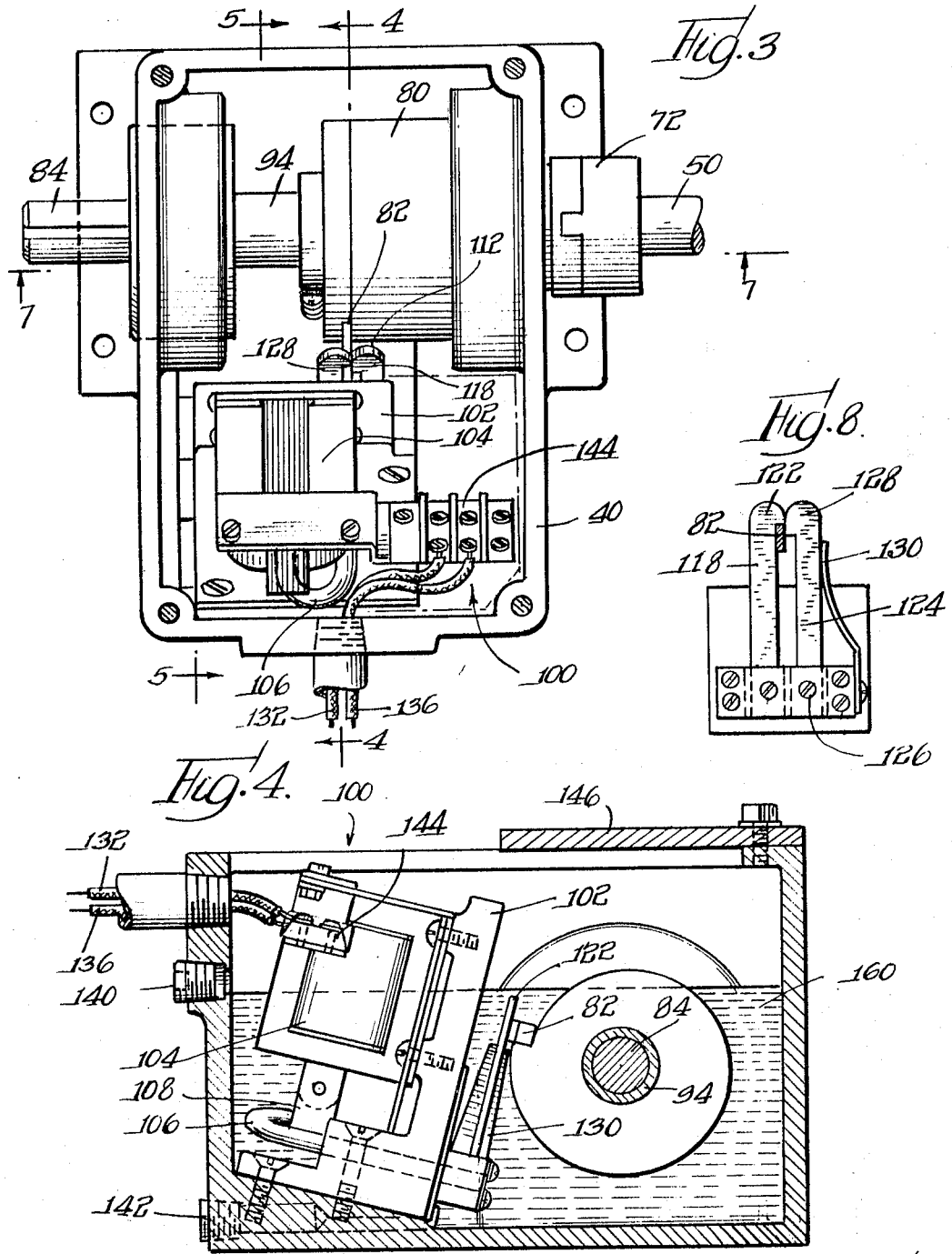

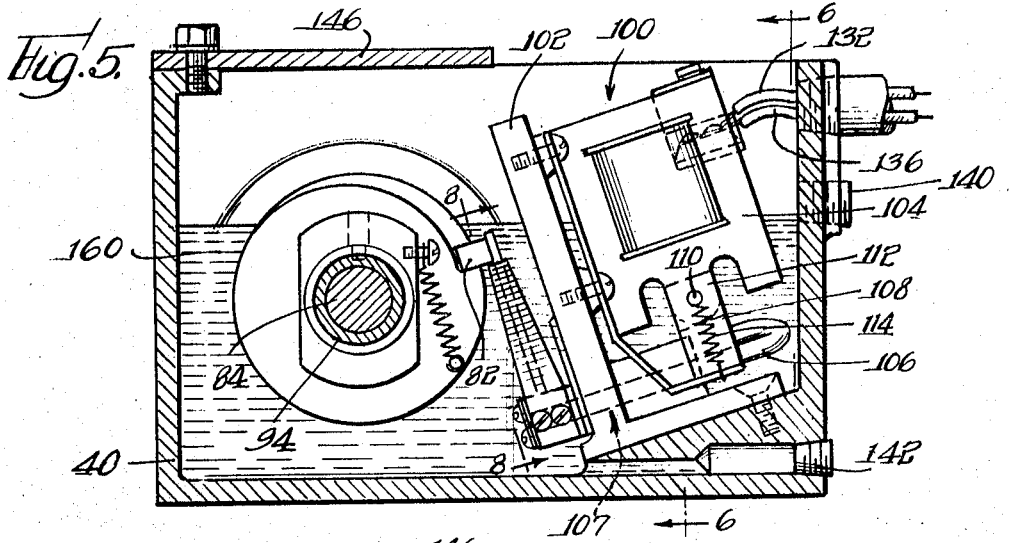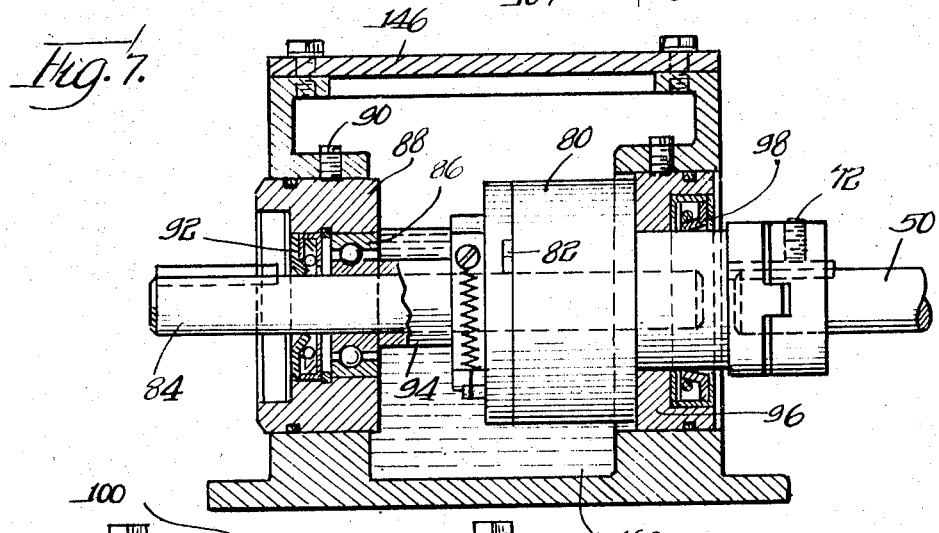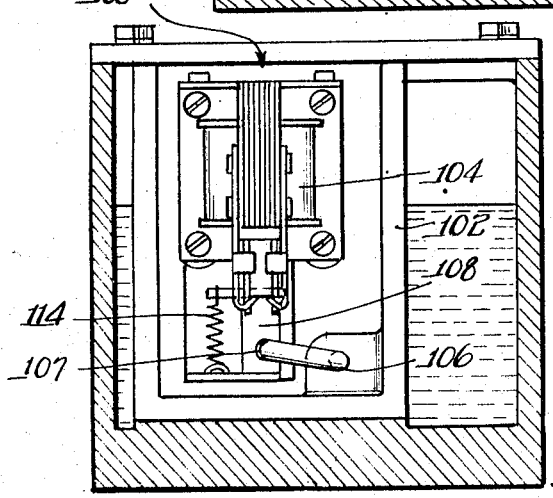

United States Patent Office
3,455,321
Patented July 15, 1969

3,455,321
ADDITIVE INJECTION SYSTEM
Jac B. Flynn, Elgin, Ill., assignor, by mesne assignments, to Hills-McCanna Company, Carpentersville, Ill., a corporation of Delaware
Filed Apr. 8, 1966, Ser. No. 541,242
Int. Cl. G05d *11/035;* F16d *13/74*
U.S. Cl. 137—101.21   3 Claims

ABSTRACT OF THE DISCLOSURE

An additive injection system comprises a flow indicator including means for generating an electrical signal indicating a specified quantity of fluid flow in a single revolution, electro-mechanical clutch actuator arranged to receive the electrical signal and to connect selectively a continuously operating, rotary drive and an injecting pump by means of a clutch connected to the actuator. The clutch and the actuator are contained in a common housing to be immersed in a lubricating medium.

---

Figure 1:
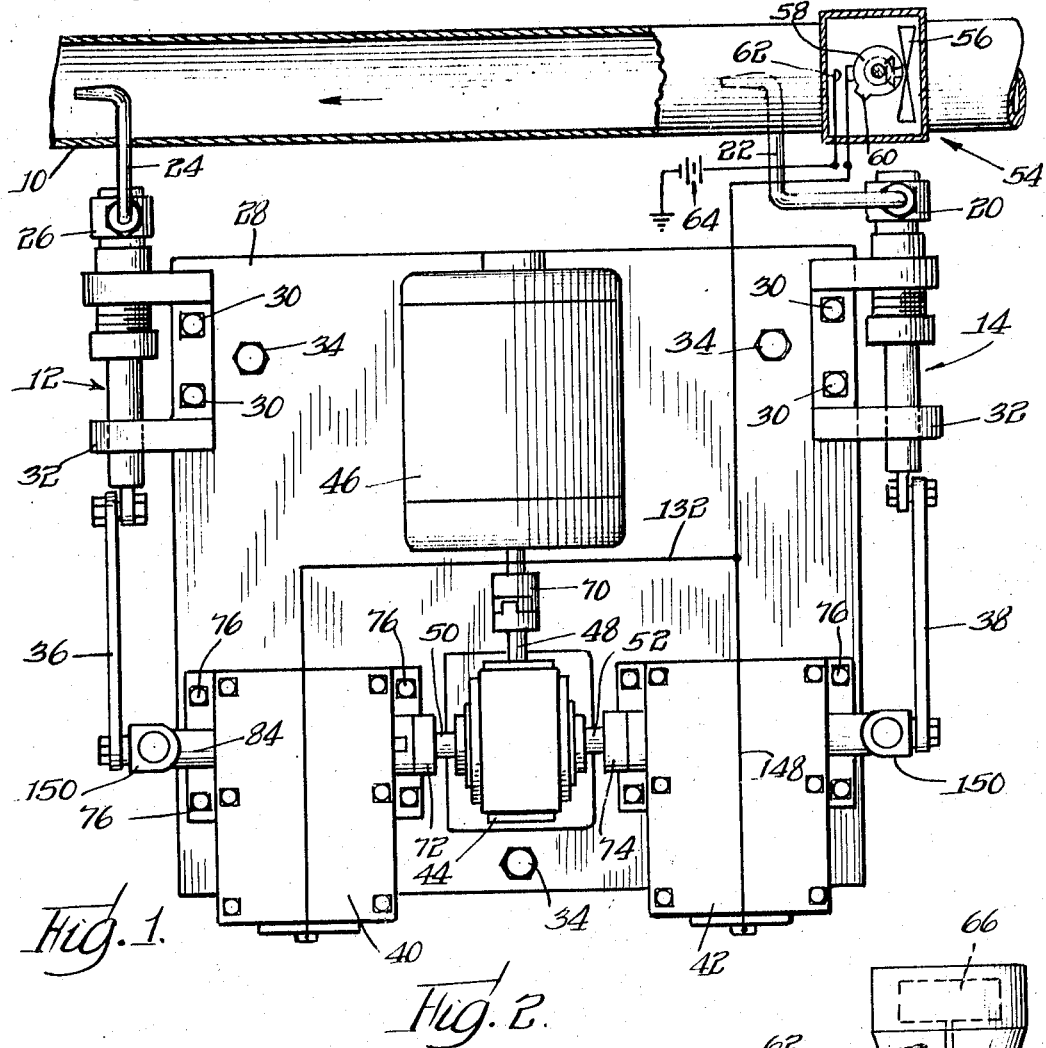

This invention relates to a system for injecting fluid additives into a fluid stream and more particularly to a system for intermittently injecting a predetermined volume of a fluid additive into a predetermined volume of a main fluid flowing in a pipeline.

When a relatively small volume of an additive is blended, in a predetermined proportion, with a relatively large volume of a fluid, flowing in a pipeline, the injection of the additive, into the fluid stream, must be coordinated with the flow rate of the fluid. In order to obtain the predetermined proportion of additive in the fluid stream, the rate of injection of the additive must be increased when the flow rate of the fluid stream increases. Conversely, the rate of injection of the additive must be deceased when the flow rate of the fluid stream decreases.

If the rate of injection of the additive is not correctly coordinated with the flow rate of the fluid in the pipeline, the fluid will not contain the required proportion of the additive. The fluid, which has an incorrect proportion of the additive, must then be reprocessed to bring the proportion of additive within the fluid to the correct level. Since reprocessing of the main fluid greatly increases production costs, it is important for the efficient operation that the correct amount of additive be blended with the main fluid stream during the first operation.

A malfunction of the additive injection equipment could, if undetected over a long period of time, result in the blending of an incorrect proportion of the additive with many thousands of gallons of the main fluid. A malfunction of the additive injection system can result from either a complete breakdown of the injection equipment or a failure of the injection equipment to respond properly to variations of the flow rate of the fluid stream. The additive injection equipment must, therefore, be extremely reliable in its operation and response to variations in the rate of flow of the fluid stream in the pipeline.

When the additive injection equipment breaks down, all of the equipment used for processing the main fluid must be stopped until the additive injection equipment is repaired. Efficient plant operation requires that the "down time" utilized for repairs be held to a minimum. Thus, repairs of the additive injection equipment must be quickly and easily performed to minimize interruption in the processing of the main fluid.

In many processes it is necessary to inject two or more additives into the main fluid. The amount injected of each additive will vary depending upon the desired proportion of the particular additive relative to the main fluid. Thus, the fluid injection equipment must, in many processes, be capable of injecting different quantities of two or more additives into the fluid stream in a pipeline.

Therefore, one of the objects of this invention is to provide an additive injection system which is responsive to variations in the flow rate of a main fluid into which the additive is being injected.

Another object of this invention is to provide an additive injection system which will operate for a relatively long period of time without a breakdown or malfunction.

Another object of this invention is to provide an additive injection system which can, in the event of a breakdown, be repaired quickly and easily in a minimum of time.

Another object of this invention is to provide a fluid injection system which is capable of injecting two or more additives into a main fluid stream.

Another object of this invention is to provide a fluid injection system which is capable of blending different proportions of two or more additives with a main fluid stream moving through a pipeline.

Figure 2:
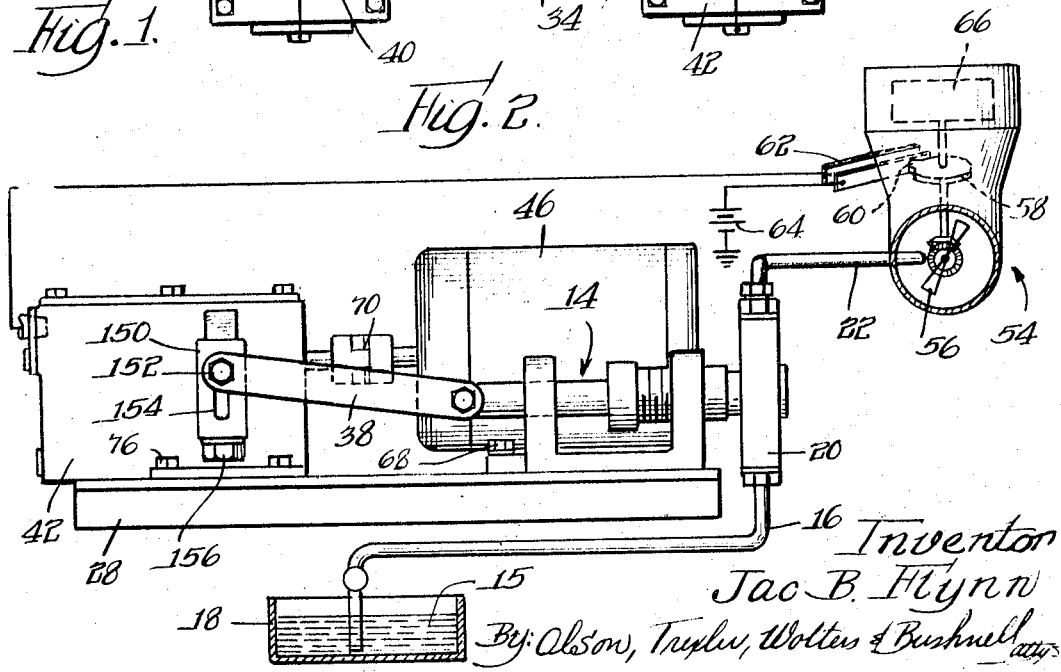

For a fuller understanding of the nature and objects of the invention, reference should be had to the following detailed description, taken in connection with the accompanying drawings, wherein:

FIG. 1 is a plan view of the additive injection system;
FIG. 2 is an elevational view of the additive injection system of FIG. 1;
FIG. 3 is a plan view of the clutch assembly module;
FIG. 4 is a detailed fragmentary view taken along the line 4—4 of FIG. 3;
FIG. 5 is a detailed elevational view taken along the line 5—5 of FIG. 3;
FIG. 6 is a detailed elevational view of the actuator solenoid assembly taken along the line 6—6 of FIG. 5;
FIG. 7 is a detailed elevational view of the clutch assembly taken along the line 7—7 of FIG. 3; and
FIG. 8 is a fragmentary detailed view of the release mechanism for the clutch taken along the line 8—8 of FIG. 5.

Referring now to the drawings in greater detail, there is shown in FIG. 1 a system for injecting two additives into a main fluid stream flowing in a pipeline 10. The fluid additive is injected into the pipeline by positive displacement type pumps 12 and 14. The pumps 12 and 14 are of the plunger type and are of a generally known constructon. An additive 15 is conducted to the pump 14 by a pipe or tube 16 from a trough or tank 18. The pump has a pair of check valves in an outer end portion 20 of the pump 14. The check valves, in the outer end portion 20 of the pump 14, permit the fluid additive 15 to flow in only one direction, i.e. from the tank 18 to the pipeline 10. It will be apparent that when the plunger is withdrawn from the pump 14 the additive will be drawn or sucked into the end portion 20 of the pump 14 from the tank 18. A check valve in the upper part of the end portion 20 of the pump 14 will prevent fluid from being drawn from the pipeline 10, through a tube or pipe 22 when the piston is withdrawn from the cylinder of the pump 14. A second check valve in the lower part of the end portion 20 will prevent the additive 15 which has been drawn into the end portion 20 of the pump 14, from being forced back into the tank when the piston for the positive displacement pump 14 is forced back into the pump cylinder. As previously stated, the construction and operation of such a positive displacement pump and check valve system is, per se, well known to those skilled in the art and need not be described in greater detail at this time.

The pump 12 is connected to a second additive tank, not shown, in a similar manner. A line or tube 24 connects an end portion 26 of the pump 12 to the pipeline 10. The arrangement of the apparatus for connecting the pump 12 to the pipeline 10 will be apparent from the previous explanation of the structure utilized to connect the pump 14 to the pipeline 10.

Both pumps 12 and 14 are mounted on a pair of brackets 32 which are connected to the base member 28 by bolts 30. The base 28 may be connected to a suitable support by three bolts 34 which extend through the base member 28. The pumps 12 and 14 are connected by a pair of links 36 and 38 to two clutch assembly modules or housings 40 and 42. The clutch housings 40 and 42 are both connected to a common gear reducing mechanism 44. The gear reducing mechanism 44 is driven by an electric motor 46.

The electric motor 46 continuously drives an input shaft 48 to the gear reducer 44. The continuous input to the gear reducer 44 is transmitted by a pair of shafts 50 and 52 to the clutch assembly modules or housings 40 and 42. As will be explained in greater detail subsequently, the clutch assembly modules or housings 40 and 42 contain a single revolution clutch mechanism which changes the continuous rotation of the shafts 50 and 52 into a selectively intermittent single revolution output to the links 36 and 38 to drive the pumps for a single cycle.

The single revolution clutch mechanisms in the modules 40 and 42 are controlled by an indicator assembly 54 which is connected to the pipeline 10. The indicator assembly 10 is located upstream from the pipes 22 and 24 so that the indicator is responsive to only the flow of the main fluid. The indicator assembly 54 includes a propeller 56, or positive displacement metering device, which is connected, by suitable gearing, to a cam member 58 and is driven by the flow of fluid in the pipeline 10. The cam member 58 has a nose or projection 60 which closes a pair of normally open contacts 62 whenever a predetermined volume of fluid has passed through the pipeline 10. The normally open contacts 62 are connected to a battery 64 and to the single revolution clutch mechanism in the modules or housings 40 and 42. In a manner to be explained in greater detail subsequently, when normally open contacts 62, the single revolution clutch mechanism in both modules 40 and 42 will be engaged for a single revolution to drive the pumps 12 and 14, through the links 36 and 38 for a single cycle. It will be apparent that the pumps 12 and 14 will, therefore, be simultaneously driven for a single cycle to inject a predetermined quantity of fluid into the fluid stream flowing in the pipeline 10, whenever a predetermined quantity of main fluid in the fluid stream has passed to the indicator mechanism 54. A meter 66 may be connected to the cam 58 to provide a visual indication of the total amount of fluid which has passed through the pipeline 10, or of the flow rate of the fluid within the pipeline 10.

Since all of the components of the injection system are bolted onto base member 28, it will be apparent that any one component, if it becomes defective, may be readily removed from the base member and a new one installed in its place. The motor 46 is connected by bolts 68 to the base 28 and it is connected to the gear reducer 44 by a coupling 70. To remove the motor from the base 28, it is merely necessary to loosen the coupling 70 and disconnect the bolts 68 from the base 28.

In a similar manner, the gear reducer 44 is connected to the two clutch assembly modules or housings 40 and 42 by a pair of couplings 72 and 74, which are connected to the shafts 50 and 52. The gear reducer 44 may be removed from the base 28 by loosening the bolts at the base of the gear reducer 44 and the couplings 72 and 74. The two clutch assembly modules or housings can, as will be apparent from the foregoing explanation, be removed from the base 28 by loosening bolts 76 at the base of the housings or modules 40 and 42, and the couplings 72 and 74. The modules 40 and 42 may be disconnected from the pumps 12 and 14 by removing the bolts which connect the links 36 and 38 to the pumps. The pumps 12 and 14 may also be removed from the base 28 by disconnecting the links 36 and 38 to the bolts 30 at the base of the brackets 32. Since all of the components of the additive injection system can be easily disconnected from each other, by merely loosening bolts and couplings, it is apparent that a defective component of the additive injection system can be easily and quickly replaced by a similar operative component.

The clutch assembly module or housing 40 is shown in greater detail in FIGS. 3 through 7. The clutch assembly module 40 has a clutch 80 mounted therein (see FIGS. 3 and 7). The clutch 80 is utilized to intermittently transmit the continuous rotation of the shaft 50 and coupling 72 to a clutch shaft 84. The clutch 80 can be of any known type wherein the clutch is engaged for rotation whenever a projecting ear or tab 82 is released by a release mechanism, which will be explained in greater detail later. The clutch 80 is mounted within the module or housing 40 on the shaft 84 which extends from one side of the housing and is connected by the link 36 to the pump 12. The shaft 84 is mounted for rotation within a roller bearing 86 which is retained within the bearing housing 88 in the wall of the housing or module 40 by a set screw 90.

An oil seal 92 is positioned adjacent the roller bearing 86 to prevent leakage of oil from the interior of the housing or module 40. A spacer 94 holds the clutch 80 firmly in position for rotation in a guide bearing 96 at the right side of the housing 40, as shown in FIG. 7. A seal 98 is positioned exteriorly of the guide bearing 96 and prevents leakage of oil at the joint between the guide bearing and clutch member 80.

The clutch 80 is normally held in a disengaged position by an actuator assembly 100. The actuator assembly 100 is mounted on a supporting wall 102 which is bolted to the bottom of the housing or module 40. The actuator assembly 100 includes a solenoid 104 which is connected to an actuator bar 106. The actuator bar 106 has a generally U-shape and extends through an aperture 107 in the mounting wall 102. One end of the bar 106 is connected to the solenoid 104 by a link 108 which is pivotably connected by the pin 110 to the core 112 of the solenoid 104 (see FIG. 5).

The core 112 of the solenoid 104 is drawn downwardly, as shown in FIGS. 5 and 6, by the spring 114 which is connected to the pin 110 and to the base of the support wall 102. When the solenoid 104 is actuated the core 112, of the solenoid, will be drawn upwardly into the body of the solenoid 102. The link 108 will be drawn upwardly by the core 112 and will pivot, about the pin 110, and will simultaneously rotate the bar 106 in the aperture 107 of the support wall 102. As will be explained more fully subsequently, rotation of the actuator bar 106 will release the ear or tab 82 of the clutch 80 to enable the clutch to become engaged for a single revolution, to thereby operate the pump 12 to inject a predetermined quantity of the additive 15 into the main fluid stream in the pipeline 10.

The actuator bar 106 is connected, at its opposite end, to a clutch release member 118. The clutch release member 118 (see FIG. 8) has a nose portion 122 which engages the ear or tab 82 of the clutch 80. When the solenoid 104 is actuated, the bar 106 will pivot the release member 118 to the left, as shown in FIG. 8, to release the ear or tab 82 from the nose 122 of the release member 118. When the ear or tab 82 is so released, the clutch 80 will become engaged until the ear or tab is again retained against movement by the release member 118. Since the solenoid 104, as will be explained more fully subsequently, is actuated for only a period which is considerably less than the amount of time required for the clutch 80 to make a single revolution, the release member 118 will pivot back into position to engage the ear or tab 82 after the first revolution of the clutch 80.

If the clutch 80 were permitted to rotate for more than one revolution, the pump 12 would be operated for more than one cycle and inject too much of the additive 15 into the fluid stream in the pipe line 10. Therefore, a secondary release member 124 is pivoted about a pin 126 to a position for engaging the ear or tab 82 whenever the release 118 is disengaged from the ear or tab 82. The secondary release 124 has a nose portion 128 which is positioned adjacent and slightly below the nose portion 122 of the release 118. It will be apparent, from an inspection of FIG. 8, that the nose 128 of the secondary release 124 will not engage the ear or tab 82 when the release 118 is in position. However, when the solenoid 104 is actuated, the release 118 is swung to the left. A spring 130 will then press the secondary release 124 left to a position where the ear or tab 82 will engage the nose 128, after a single revolution, if the release member 118 is not returned to its normal position, as shown in FIG. 8. The release member 118 is rotated back to its normal position by the bar 106 under the influence of the return spring 114. Since the return spring 114 has a considerably higher spring rate, i.e. stiffness, than the spring 130, the release member 118 will push the secondary release 128 to the position shown in FIG. 8, so that the nose 122 of the release member 118 will engage the ear or tab 82.

The solenoid 104 is connected by the wire 132 to the normally open switch 62 in the indicator 54. When the cam 58 closes the normally open switch 62, a battery 64 will be connected to the solenoid 104 over the wire 132. The circuit is completed to ground by a lead 136 from the solenoid 104. Thus, when a predetermined volume of fluid has passed through the pipe 10, and the cam 58 has closed the switch 62, the solenoid 104 will be actuated for the relatively brief time during which the nose 60 of the cam 58 holds the switch 62 closed. When the nose of the cam 60 is rotated past the switch 62, the switch will open and the solenoid 104 will be released. The time during which the solenoid is actuated, as previously mentioned, is less than the time it takes for the clutch 80 to rotate one revolution. Thus, the release member 118 will be pivoted back into its normal position, as shown in FIG. 8, to catch the ear or tab 82 after the clutch 80 has made a single revolution.

The clutch assembly housing 40 is normally filled with oil. The oil 160 lubricates the clutch mechanism 80 and the moving parts of the actuator 100. The oil 160 is inserted into the housing or module 40 through the plug 140 (see FIG. 4) in the wall of the housing or module 40. The oil level in the module or housing will be maintained, in normal usage, at the same level as the bottom portion of the plug 140. The oil 160 may be drained from the housing or module 40 by removing a drain plug 142 near the base of the module or housing.

The operative life of the clutch 80 and the actuator assembly 100 has been found to be more than doubled by the use of an oil medium 160 within the housing or module 40. The constant engaging and disengaging of the clutch mechanism 80 for a single revolution would soon wear the clutch out if it were not immersed in the oil lubricating medium 160. Since the leads 132 and 136 are connected to the solenoid 104 at a terminal strip 144 located at the uppermost corner of the solenoid 104, the connections will be above the upper surface of the oil medium and will be readily accessible by removing a lid 146 for the housing or module 40. In addition to increasing the operative life of the clutch 80, the oil medium also dampens the noise from the operation of the actuator assembly 100 and clutch 80, and prevents atmospheric corrosion of the clutch parts.

The housing module 42 is substantially the same in structure as the housing module 40. The housing module 42 differs, of course, from the housing module 40, in that the single revolution clutch assembly is oppositely positioned within the housing or module 42 to engage the coupling 74 at the left wall of the module 42, as seen in FIG. 1, rather than the right wall as is the case with the module 40. The actuator assembly within the module 42 is connected by the lead 148 to the switch 62 of the indicator assembly 54. Thus, the clutch within the module 42 will be actuated simultaneously with the clutch within the module 40 when the cam nose 60 closes the normally open switch contacts 62.

It will be apparent that both pumps 12 and 14 will inject their respective additives, substantially simultaneously into the fluid stream in the pipeline 10, since both clutch assemblies in the modules 40 and 42 are actuated simultaneously. The amount of additive which is injected by the pump 12 or 14 can be adjusted by varying the stroke of the pump plunger. The plunger of the pump 14, as shown in FIG. 2, is connected by the link 38 to a connector 150 which is connected to the output shaft 84 from the clutch assembly within the module 42.

When the connector member 150 is substantially horizontal and to the right of the position shown in FIG. 2, the plunger of the pump 14 will be the furthest to the right and will have just completed injecting additive into the fluid flowing into the pipeline 10. When the connector member 150 has rotated past the right position to a substantially horizontal position on the left side of the position shown in FIG. 2, the plunger of the pump 14 will have just withdrawn a predetermined volume of additive from the trough or tank 18.

The amount of additive which is injected into the pipeline 15 by the pump 14 can be varied by adjusting the stroke of the pump plunger. The greater the stroke of the pump plunger the larger the volume of fluid which will be injected into the pipeline 10, and conversely, the shorter the stroke of the pump plunger the smaller the volume of additive which will be injected into the pipeline 10 by each cycle of the pump. Varying the position of end portion 152 of the link 38 in a slot 154 in the connector 150 will vary the stroke of the pump plunger. The position of the end portion 152 of the link 38 can be varied by turning the adjusting nut 156 which will move the end portion 152 with the link 38 relative to the slot 154.

It will be obvious that the amount of additive which is injected by the pumps 12 and 14 will depend upon the size of the plunger utilized in the pump. If a process requires a large amount of one additive and a relatively small amount of a second additive was to be carried out by the injection system shown in FIG. 1, a pump having a relatively large plunger would be utilized for the pump 12, while a pump having a relatively small plunger would be utilized for the pump 14. Thus, the amount of additive which is injected by each pump will depend upon the size of the pump. Pumps of different sizes can be used when different amounts of two additives are to be injected into the fluid stream flowing in the pipeline 10. The amount of additive injected by a given pump can, as previously explained, be varied by adjusting the connector member 150. While only the connector member 150 for the pump 14 has been shown in detail in FIG. 2, it should be understood, of course, that a similar connector member is utilized for the pump 12, see FIG. 1.

For purposes of affording a more complete understanding of the invention, it is advantageous now to provide a functional description of the mode in which the component parts thus far identified operate. The injection system shown in FIG. 1 is connected to the pipeline 10 by the two tubes or pipes 22 and 24 which are connected to the pumps 12 and 14. Although plunger type pumps are utilized in a preferred embodiment of this invention, it will be apparent that other types of pumps, such as the diaphragm head type, could be used.

The operation of the pumps 12 and 14 is coordinated with the rate of fluid flow through the pipeline 10 by the indicator assembly 54. When fluid flows through the pipeline 10, the propeller 56 is rotated, causing the cam 58 to be rotated through a suitable gear mechanism. When the cam 58 rotates the normally open switch 62 is closed periodically by the nose 60 of the cam 58. It will be apparent that the frequency with which the switch 62 is closed will vary directly with the rate of flow of the fluid through the pipeline 10.

Closure of the switch 62 actuates a single revolution clutch assembly contained within the modules 40 and 42. The single revolution clutch assembly includes an actuator assembly 100 and a clutch member 80. When the switch 62 is closed, the solenoid 104 will rotate the release member 118 which will become disengaged from the ear or tab 82 of the clutch 80. When the ear or tab 82 is released, the clutch 80 becomes engaged and begins to rotate. At this time, the solenoid 104 will be released, since the nose 60 of the cam 58 will have passed out of contact with the switch 62. The release of the solenoid 104 will cause the actuator bar 106 to swing the release member 118 back to the position shown in FIG. 8. Since the ear or tab 82 has rotated, from the position shown in FIG. 5, it will not be engaged by the nose 122 of the release member 118 at this time. The ear or tab 82 will continue its rotation for a complete revolution, at which time it will again engage the nose 122 of the release member 118. When the ear or tab 82 is engaged by the release member 118, the clutch 80 will become disengaged.

The single revolution of the clutch 80 will be transmitted by the shaft 84 to the connector member 150 which is connected to the shaft 84. The connector member 150 will then rotate a full revolution and will cause the link 36 to move the plunger of the pump 12 for a complete cycle. Actuation of the pump 12 for a complete cycle will inject a predetermined amount of additive into the pipeline 10 through the tube or line 24. In a similar manner, the pump 14 will also be actuated, by the single revolution clutch assembly within the module 42, to inject a predetermined amount of additive into the pipeline 10 through the tube or line 22.

It should be noted that while two injection assemblies have been shown in FIG. 1, one of the injection assemblies, for instance the one on the right in FIG. 2, could be disconnected from the gear reducer 44 and the unit operated with only a single additive injector 12. Since the housing of module 42 can be easily disconnected from the base member 28 by removing the bolts 76 at the base of the module and loosening a coupling 74, it will be apparent that the additive injection assembly of FIG. 1 can readily be converted into a single injection assembly.

The modular construction of the injection assembly of FIG. 1 facilitates the replacement of any portion of the assembly which becomes defective during operation. Since the single revolution clutch assemblies are substantially immersed in an oil medium which lubricates the clutch and actuator assembly, it will be apparent that the maintenance of the injection system will be held to a minimum. This is particularly true, since the oil 160 more than doubles the operative life of the single revolution clutch assembly.

While particular embodiments of the invention have been shown, it should be understood, of course, that the invention is not limited thereto, since many modifications may be made; and it is, therefore, contemplated to cover by the appended claims any such modifications as fall within the true spirit and scope of the invention.

What is claimed is:

1. A system for injecting an additive into a fluid stream comprising a flow indicator means responsive to the quantity of fluid flowing in said stream and including means for generating an electrical signal indicating a specified quantity of fluid flow; continuously operating, rotary drive means; a housing positioned adjacent to said drive means; a lubricating medium substantially filling said housing; a clutch mounted in said housing and connected to said drive means, said clutch being substantially immersed in said lubricating medium; a single revolution electro-mechanical clutch actuator means mounted adjacent to said clutch in said housing immersed in said lubricating medium; pump means connected to said clutch for injecting a predetermined quantity of additive into said fluid stream upon actuation of said clutch; and electrical circuit means interconnecting said single revolution clutch actuator means and said flow indicator means whereby said clutch is engaged for a single revolution upon the passage of a predetermined quantity of fluid in said fluid stream.

2. A system as set forth in claim 1 wherein said pump means is connected to said clutch by an adjustable connector means which is movable to vary the quantity of said additive injected by said pump means into said fluid stream.

3. A system according to claim 1 which further comprises a second clutch connected to said drive means; a second single revolution, electro-mechanical clutch actuator means arranged to actuate said second clutch, a second pump means connected to said second clutch for injecting a predetermined quantity of a second additive into said fluid stream upon actuation of said second clutch; second electrical circuit means connecting said second actuator means with said flow indicator means; a second housing enclosing said second clutch and second actuator means; and a lubricating medium in said second housing substantially immersing said second actuator means and said second clutch.

References Cited

UNITED STATES PATENTS

| | | | |
|---|---|---|---|
| 667,147 | 1/1901 | Garrels et al. | 103—38 |
| 724,566 | 10/1902 | Gooley | 74—40 |
| 1,440,161 | 12/1922 | Lippincott | 192—113.2 X |
| 2,240,164 | 4/1941 | Pick | 137—9 |
| 2,280,656 | 4/1942 | McCoy | 137—101.21 |
| 2,606,745 | 8/1952 | Ball et al. | |
| 2,719,620 | 10/1955 | McDonald | 192—113.2 X |
| 2,826,211 | 3/1958 | Reed | 137—98 |
| 3,216,434 | 11/1965 | Lovendahl | 137—101.21 X |
| 3,315,606 | 4/1967 | Piros | 103—38 X |

ALAN COHAN, Primary Examiner

DAVID J. ZOBKIW, Assistant Examiner

U.S. Cl. X.R.

192—113; 222—57, 60